United States Patent
DiMaria et al.

(10) Patent No.: US 6,523,741 B1
(45) Date of Patent: Feb. 25, 2003

(54) APPARATUS FOR CONTROLLING THE RENTAL AND SALE OF AGE-CONTROLLED MERCHANDISE AND FOR CONTROLLING ACCESS TO AGE-CONTROLLED SERVICES

(76) Inventors: Peter C. DiMaria, 98 Winwood Cir., Somers, CT (US) 06071; James T. Madsen, Old Town Farm Rd., Enfield, CT (US) 06088; Peter C. Madsen, 206 Adams Hills Way, East Windsor, CT (US) 06088

(*) Notice: Subject to any disclaimer, the term of this patent is extended or adjusted under 35 U.S.C. 154(b) by 0 days.

(21) Appl. No.: 09/502,259

(22) Filed: Feb. 11, 2000

Related U.S. Application Data

(63) Continuation-in-part of application No. 08/926,284, filed on Sep. 5, 1997, now Pat. No. 6,148,091.

(51) Int. Cl.$^7$ ............................................. G06F 17/00
(52) U.S. Cl. ..................... 235/375; 235/380; 235/382; 235/381; 235/61.12; 235/61.7; 235/470; 235/379; 902/4; 902/28
(58) Field of Search ................................. 235/380, 375, 235/382, 381, 61.12, 61.7, 470, 379; 902/4, 25

(56) References Cited

U.S. PATENT DOCUMENTS

| | | | |
|---|---|---|---|
| 3,636,318 A | 1/1972 | Lindstrom et al. | 235/61.12 |
| 3,702,392 A | 11/1972 | St. Jean | 235/61.7 |
| 3,988,570 A | 10/1976 | Murphy et al. | 235/382 |
| RE30,579 E | 4/1981 | Goldman et al. | 340/149 |
| 4,369,361 A | 1/1983 | Swartz et al. | 235/470 |
| 4,506,148 A * | 3/1985 | Berthold et al. | 235/380 |
| 4,689,477 A * | 8/1987 | Goldman | 235/380 |
| 5,016,192 A * | 5/1991 | Ishido et al. | 364/518 |
| 5,030,117 A * | 7/1991 | Delorme | 434/130 |
| 5,172,785 A * | 12/1992 | Takahashi | 180/271 |
| 5,214,699 A | 5/1993 | Monroe et al. | 380/23 |
| 5,284,364 A | 2/1994 | Jain | 283/87 |
| 5,337,361 A | 8/1994 | Wang et al. | 380/51 |
| 5,367,148 A | 11/1994 | Storch et al. | 235/375 |
| 5,471,533 A | 11/1995 | Wang et al. | 380/51 |
| 5,490,217 A | 2/1996 | Wang et al. | 380/51 |
| 5,559,885 A | 9/1996 | Drexler et al. | 380/23 |
| 5,594,226 A | 1/1997 | Steger | 235/379 |
| 5,706,507 A | 1/1998 | Schloss | 707/104 |
| 5,717,776 A | 2/1998 | Watanabe | 382/116 |
| 5,722,526 A * | 3/1998 | Sharrard | 194/346 |
| 5,754,939 A | 5/1998 | Herz et al. | 455/4.2 |
| 5,781,650 A | 7/1998 | Lobo et al. | 382/118 |
| 5,805,849 A * | 9/1998 | Jordan et al. | 712/214 |
| 5,864,623 A * | 1/1999 | Messina et al. | 235/380 X |
| 5,991,429 A * | 11/1999 | Coffin et al. | 382/118 |
| 6,119,932 A * | 9/2000 | Maloney et al. | 235/380 |
| 6,148,091 A * | 11/2000 | DiMaria | 382/115 |
| 6,169,542 B1 * | 1/2001 | Hooks et al. | 345/719 |
| 6,196,460 B1 * | 3/2001 | Shin | 235/380 |
| 6,363,387 B1 * | 3/2002 | Ponnekanti et al. | 707/1 |

FOREIGN PATENT DOCUMENTS

| | | |
|---|---|---|
| EP | 0991027 A2 | 4/2000 |
| GB | 2332973 A | 7/1999 |
| GB | 2359172 A | 8/2001 |
| JP | 090245231 A | 9/1997 |
| JP | 411316818 A * | 1/1999 |

OTHER PUBLICATIONS

Do You Really Know . . . Who Is Old Enough?, ©1997 Intelli–Check, Inc.
ID–Check™ Online, http://www.intellicheck.com, excerpts taken from http://intellicheck.com/news.htm and http://intellicheck.com/page14.htm.

* cited by examiner

*Primary Examiner*—Karl D. Frech
*Assistant Examiner*—Daniel Walsh
(74) *Attorney, Agent, or Firm*—Gibbons, Del Deo, Dolan, Griffinger & Vechione

(57) ABSTRACT

The present invention relates to a method and apparatus for controlling the distribution of age controlled merchandise or services based upon inputting personal information data encoded on an identification document, such as a driver's license, to determine whether the transaction is legal.

20 Claims, 7 Drawing Sheets

APPARATUS FOR CONTROLLING THE RENTAL AND SALE OF AGE-CONTROLLED MERCHANDISE AND FOR CONTROLLING ACCESS TO AGE-CONTROLLED SERVICES

This is a continuation-in-part of 08/926,284, filed Sep. 5, 1997, now U.S. Pat. No. 6,148,091.

BACKGROUND OF THE INVENTION

1. Field of the Invention

The present invention relates to a method and apparatus for controlling the sale of age-controlled merchandise. More particularly, it relates to accessing personalized identification information and encoded age data stored in at least one machine readable medium on an individual's identification document, such as a driver's license or other official document, to determine whether an individual is of legal age.

2. Description of the Prior Art

There are various forms of identification that are commonly accepted by businesses and government agencies as proof of age. The most convenient forms of identification are government issued documents such as a driver's license, passport, social security card, voter's registration card, and immigration card. Another example of an identification document is a smart card, which contains a memory provided by an embedded integrated circuit. These documents provide statistical information regarding the authorized bearer of the identification document in at least one machine readable medium such as a barcode or magnetic stripe. Many identifying documents have more than one machine readable medium for storing identifying information. For example, a driver's license typically includes a photograph, printed textual information and visible encoded information, such as a barcode. In some cases a magnetic stripe provides a higher level of security and additional information regarding the bearer. For example, the information stored in the magnetic stripe of a driver's license may include identifying information about the authorized bearer, such as eye color, hair color, height, weight, epidermal topographical patterns, etc. Examples of epidermal topography include digital data of bearer's fingerprint, knuckle print, palm print, etc. The identifying information may include eye patterns indicative of the iris or retina of the identification document bearer. The barcode and magnetic stripe may also include data related to ascertaining the age of the bearer. Alternatively, the above information may be stored in the memory of an embedded integrated circuit on a smart card.

The importance of the driver's license is emphasized by the fact that traffic accidents caused by underaged drivers obtaining alcohol using false driver's licenses is a major contributor to fatalities, injuries and property damage. In addition, there is a need to reduce the number of youths beginning to smoke to reduce health risks. Establishments wishing to avoid the sale of tobacco or alcohol may check the photograph and date of birth printed on driver's licenses. However, many youths have easy access to counterfeit driver's licenses. Accordingly, there is a need to confirm the correct age of a customer wishing to purchase alcohol, tobacco and other age-controlled merchandise by reading encoded data on at least one machine readable medium.

Legal liability is a major concern of merchants of age controlled products or services. Most jurisdiction have stiff penalties including heavy fines and imprisonment for selling alcohol and tobacco to minors. Despite all of the precautions taken by a merchant, there still exists the possibility that these precautions may be circumvented. For example, an underage individual may have access to high quality forged identification documents. Accordingly, it is desirable to be able to immediately verify that the merchant followed reasonable precautions in dispensing an age controlled product or service.

Additionally, a merchant's own employees may bypass some of the precautions. The employees may dispense an age controlled product or service to a friend without checking their friend's identification document. Accordingly, it is desirable to be able to readily identify the employee who dispenses the product or service.

There are a number of methods and apparatuses for verifying data authenticity. For example, U.S. Pat. No. 3,636,318 discloses a verifiable identification document having a randomized unique pattern of normally invisible but mechanically detectable material (e.g. finely divided ferromagnetic material) in a zone overlapping any visible indicia. A mechanical reader scans the document to verify its authenticity. The identity of the bearer along with the unique pattern is stored in memory. When a document is later read by a mechanical reader, the bearer's name and the pattern are compared with the name and unique associated pattern stored in memory to confirm the document's authenticity.

U.S. Pat. No. 3,702,392 discloses a method and apparatus for verifying the identity of a bearer of an identification document having a plural digit identifying number as an associated security code. The authenticity of the identification document is verified by: 1) accepting a code entered by the bearer, 2) generating the security code associated with certain digits of the identifying number on the identification document, and 3) comparing the security code to the entering code to verify that the codes are the same.

U.S. Pat. No. 4,689,477 discloses a document having a verifiable composition substance and informational content. The document has a unique-counterfeit characteristic which may be machine sensed. The document is unique by reason of the opacity pattern of the document. The print and photograph alter the opacity or translucency of the document in certain specific areas. In addition, character uniqueness data is encrypted on a magnetic stripe of the identification document in that when the identification document is read, the identification document reader recognizes the document as genuine. Statistical information, such as a birth date which may be used to verify that the document is genuine, is also encrypted on the document. However, this document does not treat the question of whether the person presenting the identification document is the assigned holder.

U.S. Pat. No. 5,284,364 discloses a document security system characterized by a data substrate having a personalized polarization-altering overlay sealed to a base print and encoded with additional information readable under the influence of a polarizing viewer. Tampering with the identification document will create optical errors which become evident when the tampered document is viewed through the polarizing viewer.

U.S. Pat. No. 5,337,361 discloses a document on which encoded information is overlaid on a graphic image. The precise content of the encoded information is not important. The advantage of the coded information overlaying the photograph is that such an arrangement would make it extremely difficult to change the information on the photograph without detection.

U.S. Pat. No. 5,214,699 seeks to provide a fake-proof identification document decoding system for reading data from an EPROM memory chip, which is located on the identification document. An identification document reader accesses the memory to obtain the unique personal identification information. Although this document suggests the use of such a chip with a driver's license, they typically do not include memory chips due to cost constraints.

Notwithstanding the above prior art efforts, there remains a need for an inexpensive device that overcomes the problems associated with the prior art.

SUMMARY OF THE INVENTION

The present invention provides a device for reading encoded information stored in at least one machine readable medium on an identification document. The device uses the encoded age data to calculate the age of the bearer. The device also stores the encoded information for later retrieval.

DESCRIPTION OF THE PREFERRED EMBODIMENTS

The preferred embodiments are described with reference to drawing figures wherein the numerals represent like elements throughout.

Figure 1:
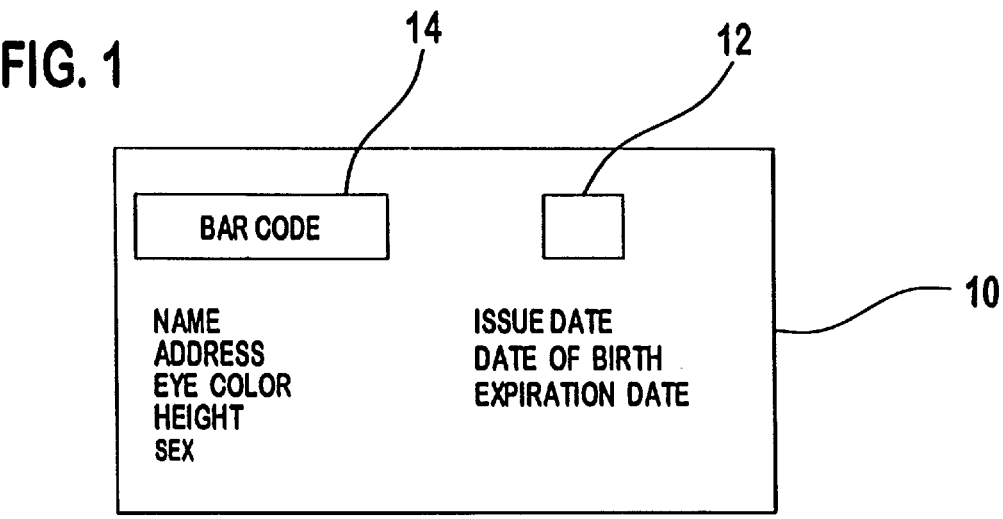
FIG. 1 is a block diagram of a typical identification document, such as a driver's license.

FIG. 1 shows a front face of an identification document 10 having a photograph 12 and a visible machine readable code 14. The identification document 10 can be anything, printed, written, encoded, etc., which is relied upon to record data or provide identification. Preferably, it is an official document or government issued document. Any machine readable media storing identifying information may be placed on the identification document 10. The identification document 10 preferably contains human readable personal identification information such as the identification document number, bearer's name, address, eye color, and height. The same personal identification information may be encoded in the machine readable form. Age data such as date of birth, identification document issue date and identification document expiration date is preferably included data in the machine readable form.

Figure 2:
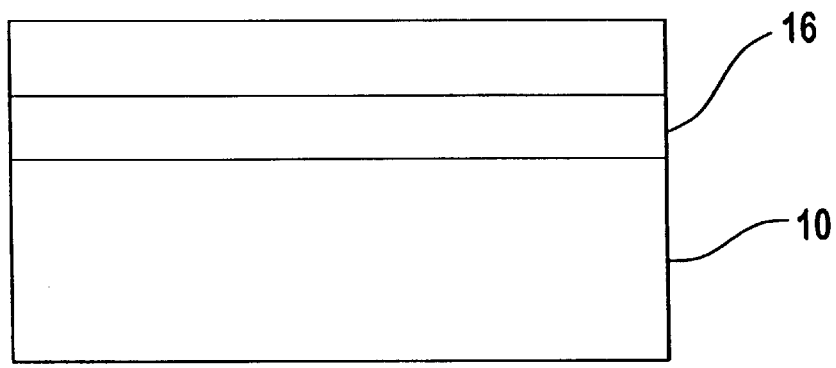
FIG. 2 is a block diagram of a typical rear face of a FIG. 1 identification document.

FIG. 2 shows the rear face of the identification document 10 which includes a magnetic stripe 16. The personal identification information from the front is also preferably encoded on the magnetic stripe 16. In addition, age data such as date of birth, identification document issue date, age at issue date and identification document expiration date is preferably encoded on the magnetic stripe 16. A personal characteristic, such as an epidermal topographical pattern, iris pattern or retina pattern, may also be encoded on the magnetic stripe 16.

Figure 3:
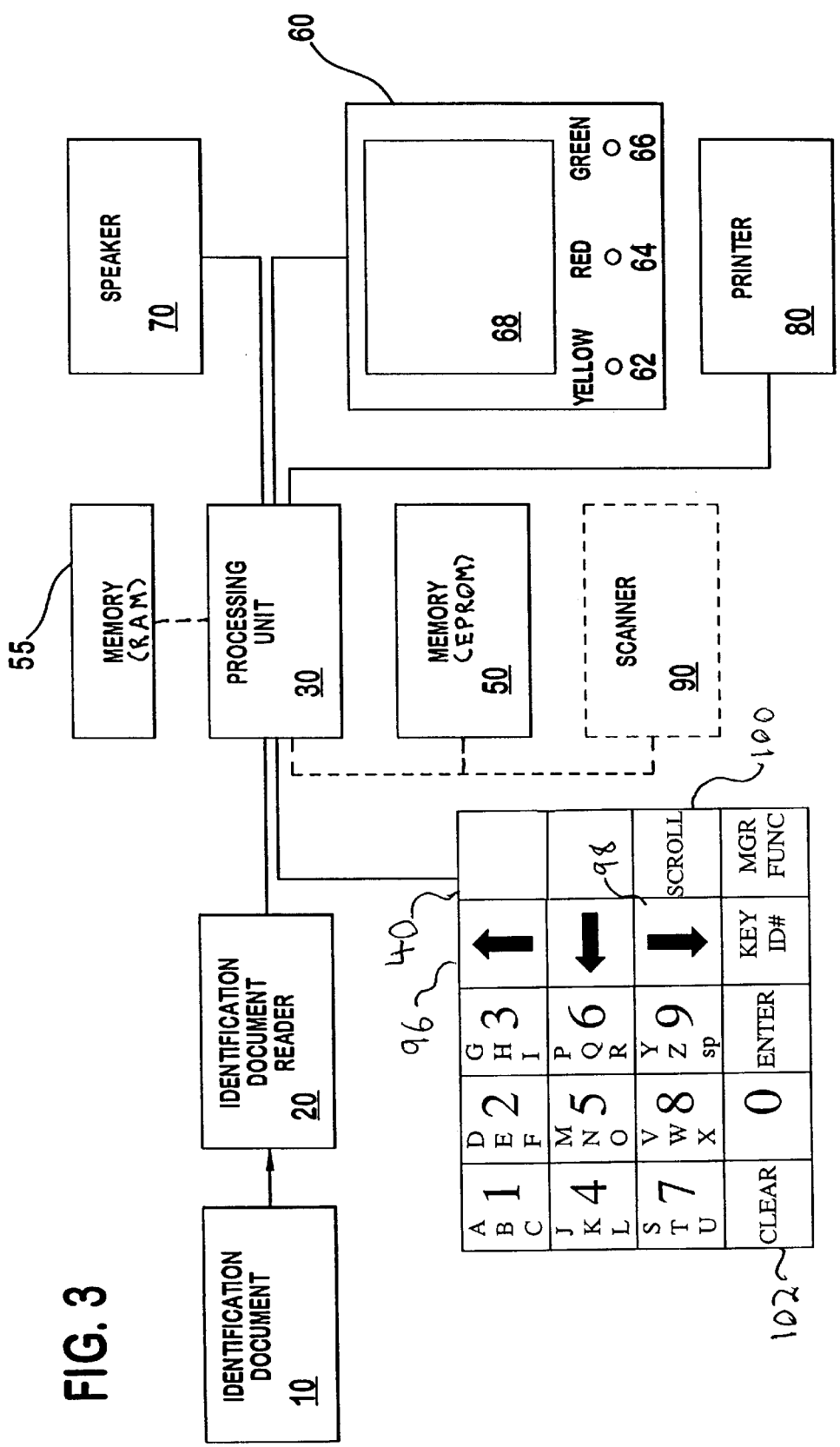
FIG. 3 is a block diagram of one embodiment of the present invention.

FIG. 3 shows a system for reading identification document 10 having a barcode 14, magnetic stripe 12 or both. The system of FIG. 3 includes an identification document reader 20 connected to a processing unit 30, such as an eight-bit processor. A keypad 40 (having keys, such as an up 96, down 98, scroll 100 and clear keys 102) is also connected to the processing unit 30. The processing unit 30 accesses a memory 50, which is preferably an EPROM, and a memory 55, which is preferably 64 k of Random Access Memory (RAM). The processing unit 30 outputs signals to a display 60, a speaker 70 and a printer 80. The display 60 has visual displays such as Light Emitting Diodes (LEDs) 62, 64, 66 and a display screen 68. A personal computer could be substituted for processing unit 30, keypad 40, memories 50 and 55, speaker 70 and display 60. A personal physical characteristic scanner 90 may also be connected to processing unit 30. An example of a personal characteristic scanner is an epidermal topographical scanner, which generates epidermal topographical patterns. A retina or iris scanner are other examples of personal physical characteristic scanners.

The processing unit 30 determines whether the bearer can purchase or rent age-controlled merchandise or gain access to an age-controlled activity based upon the bearer's age. The presented identification information, age data, current date, current time, and whether the bearer was authorized to purchase or rent age-controlled merchandise or gain access to age-controlled services is stored in memory 55. That stored information may be accessed for printing of a report by printer 80 for scrolled through on a display 68.

The legal ages for purchasing age-controlled merchandise or gaining access to age-controlled services is preferably set in the system at the factory. However, a supervisor can input a PIN number through keypad 40 to change the legal age required to purchase age-controlled merchandise or gain access to age-controlled services. In addition, the current time and date, printer set up functions and transferring data from the memory 55 to a host computer can be set by entering a PIN number via the keypad 40.

The preferred system preferably also includes a time and attendance function. For example, an operator is required to enter a code via keypad 40 before beginning a shift and to enter a code to indicate the end of a shift. This time and attendance information can be used for payroll, comparisons with cash receipts in an attempt to ascertain whether an operator is selling age-controlled merchandise without verifying the age of the purchaser.

The display 60 preferably includes a yellow 62, a red 64, and a green 66 LED. Other colors or additional lighting devices may be used. The display 60 also preferably includes a display screen 68. The light emitting devices indicate the results of computations performed by the processing unit 30 and the screen 68 may confirm them or provide instructions to the operator.

Figure 4:
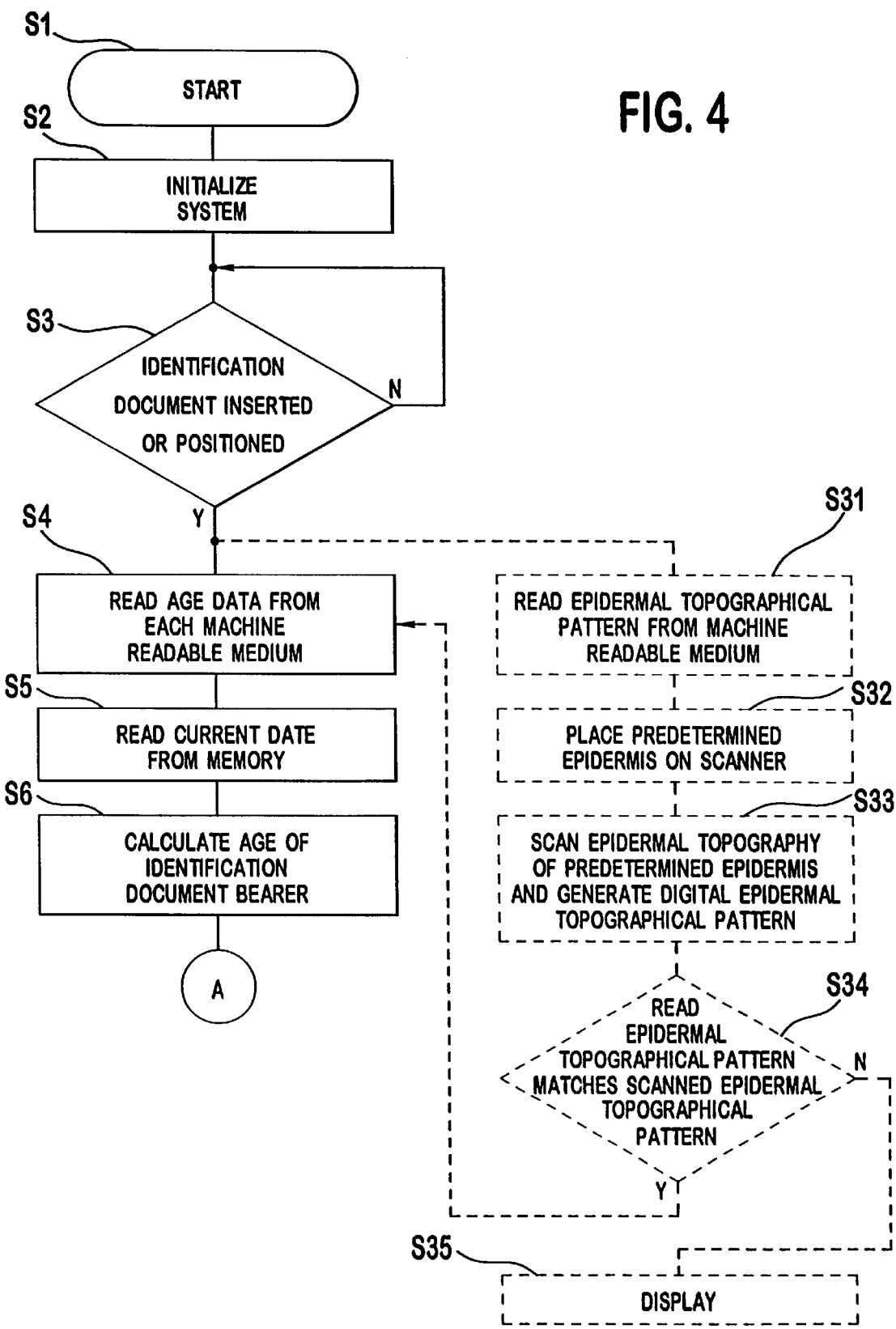
FIGS. 4 and 5 are flow charts illustrating the method steps of an embodiment of the present invention.
Figure 5:
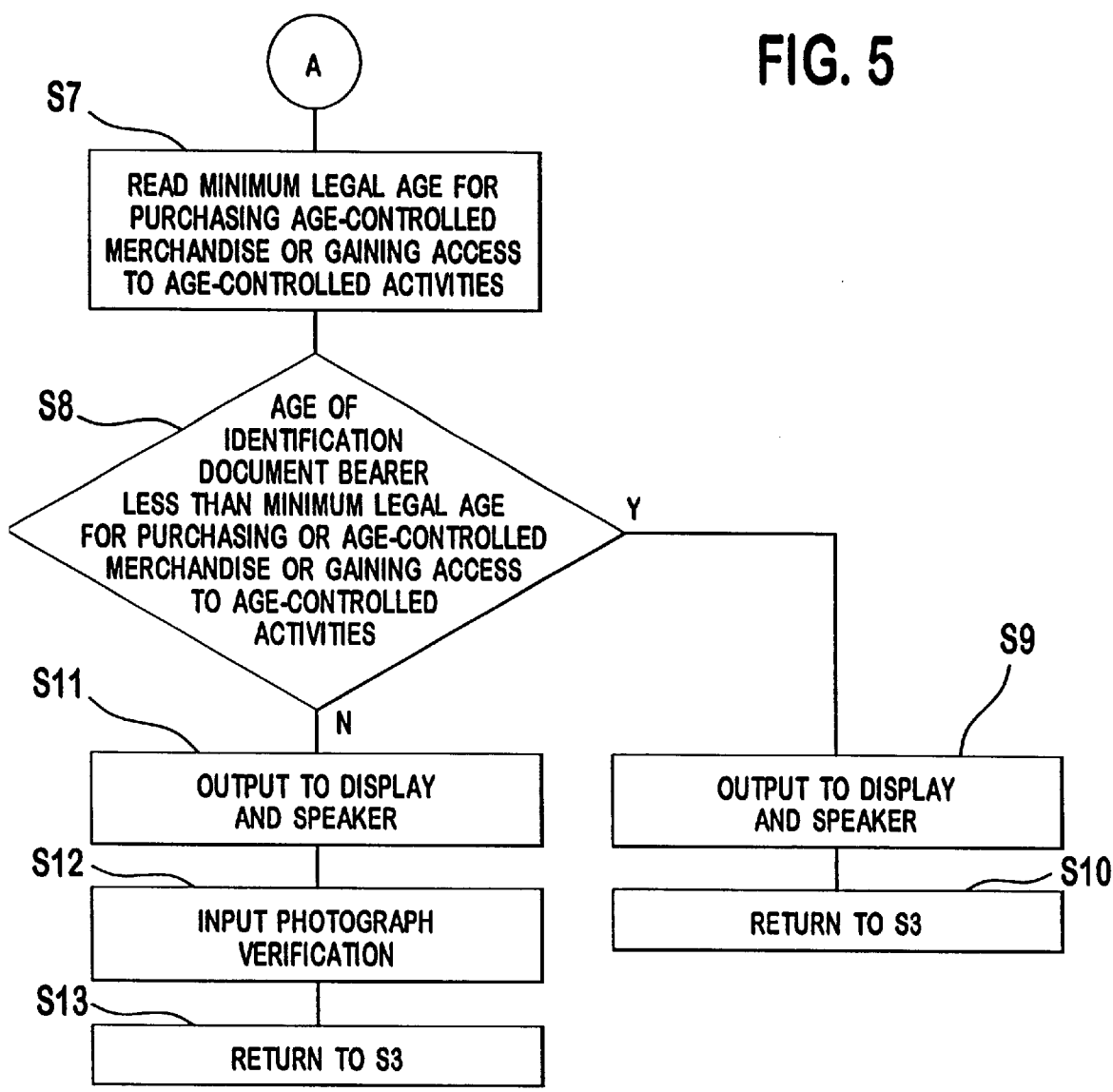

The method for utilizing the system is generally shown in the flow diagrams of FIGS. 4 and 5. After the system is started by the operator (S1), the system is automatically initialized (S2). An identification document 10 is inserted into or otherwise positioned to be scanned by identification document reader 20 (S3).

The identification document reader 20 reads at least one of the machine readable medium such as the visible machine readable code 14 or the data encoded on the magnetic stripe 16 of identification document 10 and transmits the data to processing unit 30(S4). The processing unit 30 maintains the current date and time and reads the current date and time from a register or memory (S5). By comparing the expiration date to the current date, the processing unit 30 verifies whether the identification document 10 has expired. The processing unit 30 receives the age data from identification document reader 20 and calculates the age of the bearer of the identification document 10 using the current date and age data (S6). Alternately, if the encoded data does not include age data, the identification document number or the expiration date, the operator will be prompted by screen 68 to input the missing data. The missing data, such as the date of birth shown, on the identification document 10, is input by an operator using keypad 40. Since some official identification documents 10 are issued without encoded age data, the keypad input allows for age verification using those documents.

The age of the bearer of the identification document 10 may be calculated in a variety of ways using the age data and the current date. For example, the date of birth read from the identification document 10 maybe subtracted from the current date. If the age data included the bearer's exact age on the date the bearer's identification document issued 10, the identification document 10 issued date could be used with the day of birth, month of birth and current date to ascertain the bearer's age. If the age data included the bearer's exact age on the date the bearer's identification document 10 expired, the identification document 10 expiration date could be used with the day of birth, month of birth and current date to ascertain the bearer's age. The above examples are intended to be instructive rather than restrictive because there are many different ways to encode age data and ascertain the actual age of the bearer therefrom.

Once the bearer's age has been determined, the known legal age for purchasing or renting age-controlled merchandise or gaining access to age-controlled services is read from memory 50 (S7). If the bearer's age is less than the required minimum legal age, the processing unit 30 outputs a signal to display 60 and speaker 70 (S9). After the display 60 receives the signal, the light emitting device (yellow) 62 is lit, the screen 68 advises the operator of the system that no sale, rental or service is authorized and the speaker 70 emits a predetermined number of beeps. After a predetermined time period, the system returns to step S3 (S10).

If the bearer's age is greater than or equal to the minimum age for purchasing or renting age-controlled merchandise or gaining access to age-controlled services and the document 10 is not expired, the processing unit 30 outputs a signal to the display 60 or speaker 70 (S11). After the display 60 receives the signal, the light emitting device 66 is lit. The screen 68 advises the operator that sale, rental or the service is authorized. The speaker 70 may emit a predetermined number of beeps to indicate the same condition.

Under suspicious circumstances, the screen 68 may prompt the operator to compare the photograph 12 or identification document 10 with the bearer before selling or renting controlled merchandise to the bearer or before permitting the bearer to access age-controlled services. If the operator inputs verification that the photograph 12 on the identification document 10 matches the appearance of the bearer (S12), the sale is authorized. If not, the sale is rejected. After a predetermined period of time or functional operation, the system returns to step S3 (S13).

If the bearer's age is only greater than or equal to the minimum age for purchasing or renting only some of the age-controlled merchandise or gaining access to only some age-controlled services, the processing unit 30 outputs a signal to the display 60 or speaker 70. After display 60 receives the signal, light emitting device 64 is lit, and the screen advises the operator as to the merchandise which can be sold or rented to the bearer. The screen may also advise the operator as to the age-controlled services which may be rendered to the bearer. This comparison is performed at step S8 in the flow charts of FIGS. 4 and 5.

For increased security, the identifying document may include an encoded epidermal topographical pattern stored in a machine readable form. After the identification document is inserted or positioned (S3), the stored epidermal topographical pattern is read from the machine readable medium (S31). The identification document bearer places the corresponding epidermis on the personal physical characteristic scanner 90 (S32) and a digital epidermal topographical pattern is generated (S33). If the read epidermal topographical pattern matches the scanned epidermal topographical pattern, the age data may be read from the machine readable medium (S34). If the read epidermal topographical pattern does not match the scanned epidermal topographical pattern, the display 60 provides a message indicating that the scanned epidermal topographical pattern did not match the read epidermal topographical pattern (S35). If there is no match, the operator is alerted that the card or the bearer has provided unverified identification. Alternatively, an iris or retina scanner could be substituted for the epidermal topographical scanner.

Figure 6:
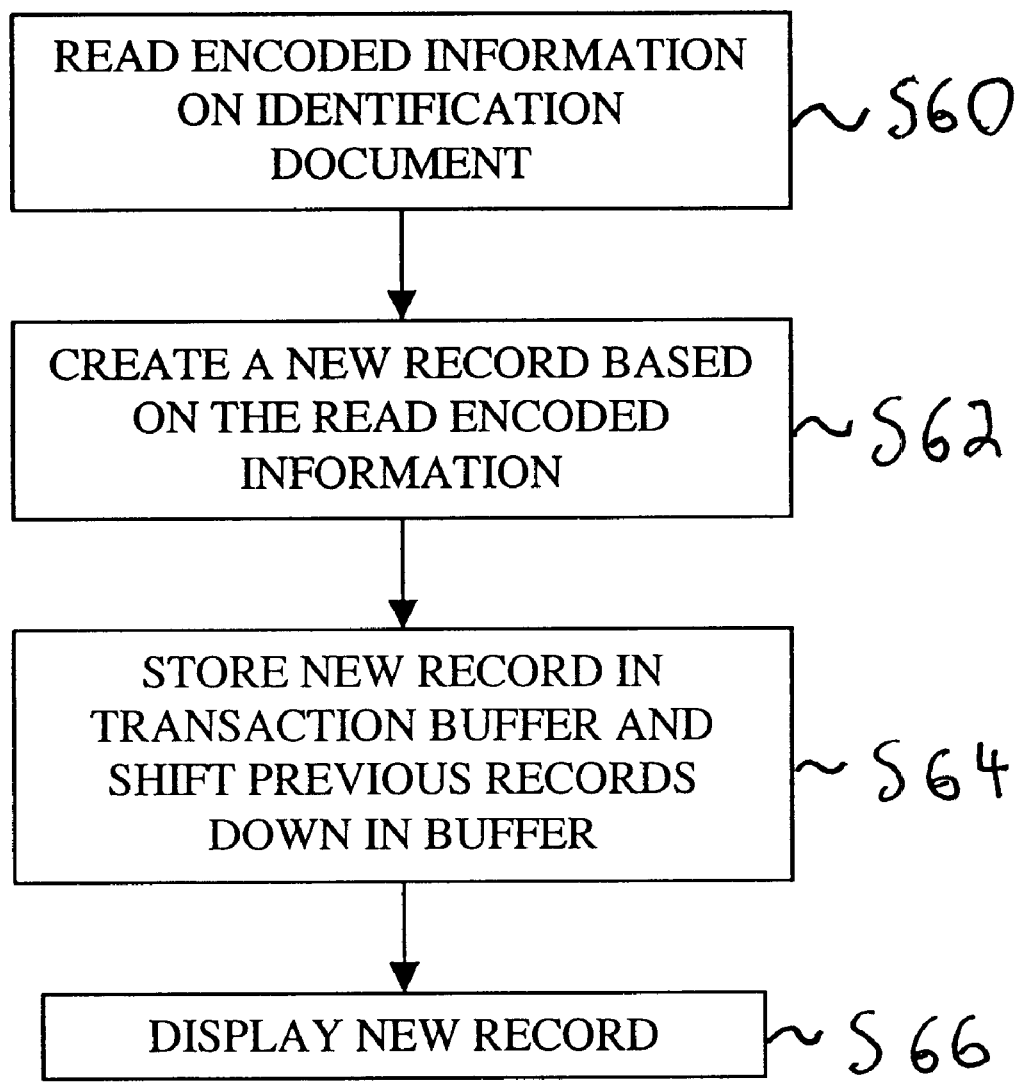
FIG. 6 is a flow chart of record creation and storage.
Figure 7:
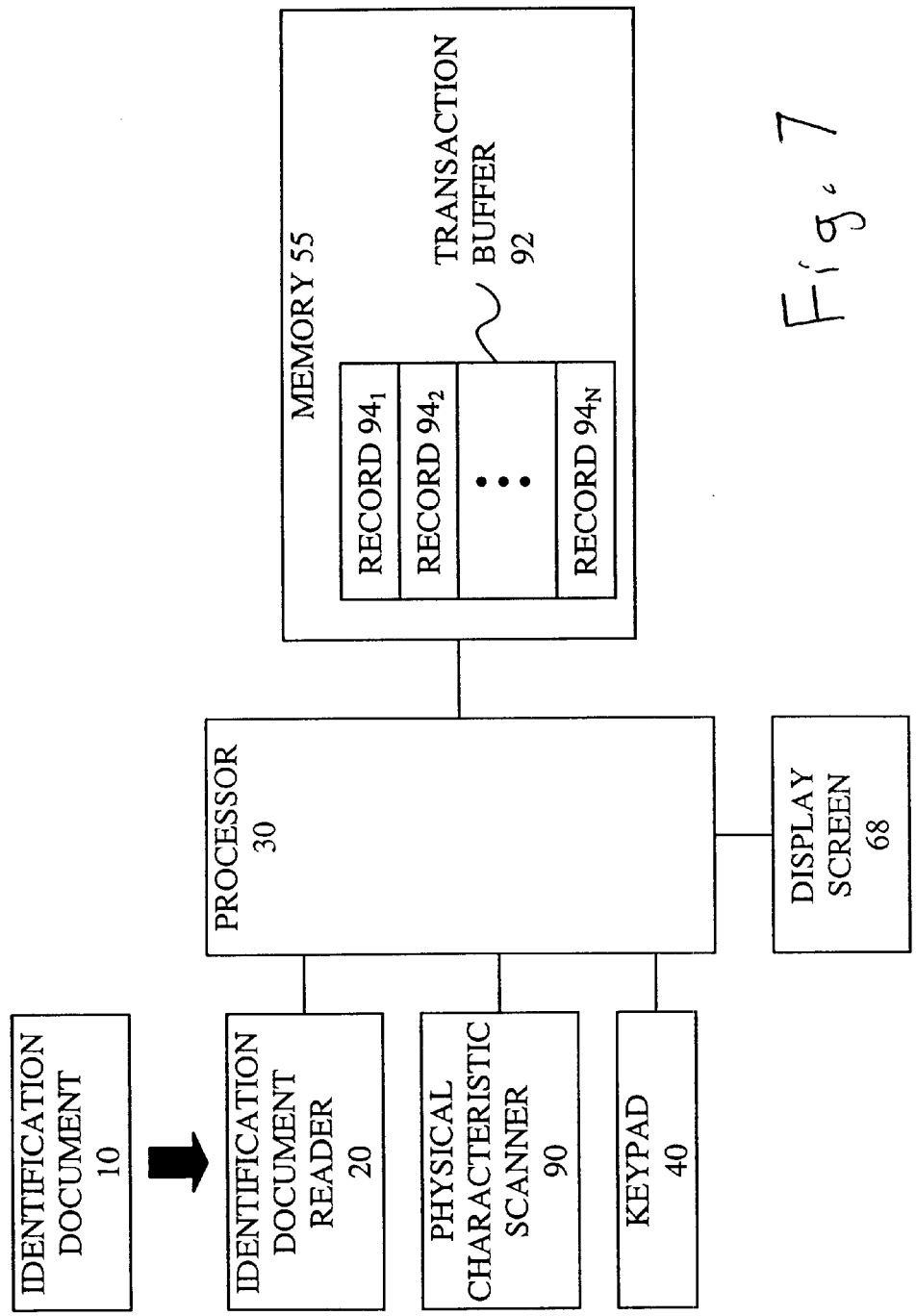
FIG. 7 is a block diagram of components used in record creation, storage and retrieval.

FIG. 6 illustrates a method for storing records for use in record retrieval. The method of FIG. 6 will be explained in conjunction with FIG. 7 which depicts the components used for the creation, storage and retrieval of records.

To participate in an age restricted activity, an individual presents an identification document 10 to verify his/her eligibility to partake in the activity. The encoded information on the identification document 10 is read by identification document reader 20 (S60). The read encoded information is sent to a processor 30. The processor 30 organizes the encoded information into a new record (S62). For a driver's license, this information includes the state issuing the driver's license, the license number, the date of birth and an expiration date.

Alternatively, the record may also contain the details of the verification process. These details include the time and date that the verification occurred, the calculated age of the individual and which activities the individual may partake, such as purchasing tobacco, alcohol or both. Based on a code inputted by an operator at the beginning and end of that operator's shift, the record may contain an identifier of the operator who conducted the verification. Operator inputted age data, such as by using keypad 40 when the document is not age encoded, may be included in the record. Additionally, if the operator inputs to keypad 40 a verification that the photograph 12 on the identification document 10 matches the appearance of the presenting individual, that input may also be included in the record. If the identification document 10 contains a stored physical characteristic, the record may contain the stored physical characteristic as well as a result of the comparison between the stored physical characteristic and a physical characteristic scanned by the physical characteristic scanner 90.

The new record created by the processor 30 is stored in a transaction buffer 92 contained in the random access memory 55. The transaction buffer 92 holds multiple records $94_1$–$94_N$, preferably on the order of one thousand records. A new record is stored as the top record $94_1$ in the transaction buffer 92 (S64). The previously stored records will be shifted down one position in the buffer 92. Thus, when a new record is stored as the top record $94_1$ in the buffer 92 (S64), the record previously stored in that position $94_1$ is moved down one position $94_2$. Due to the limited capacity of the buffer 92, during shifting the record previously stored as the bottom position record $94_N$ will be discarded or, alternatively, the new record is not stored and the display screen 68 displays "Memory Full". At such time, additional records are not accepted and the contents of the buffer 92 must be cleared, such as by discarding or downloading to another storage media. After the new record has been added to the buffer 92, the data within that record $94_1$ is displayed on display screen 40 (S66).

Figure 8:
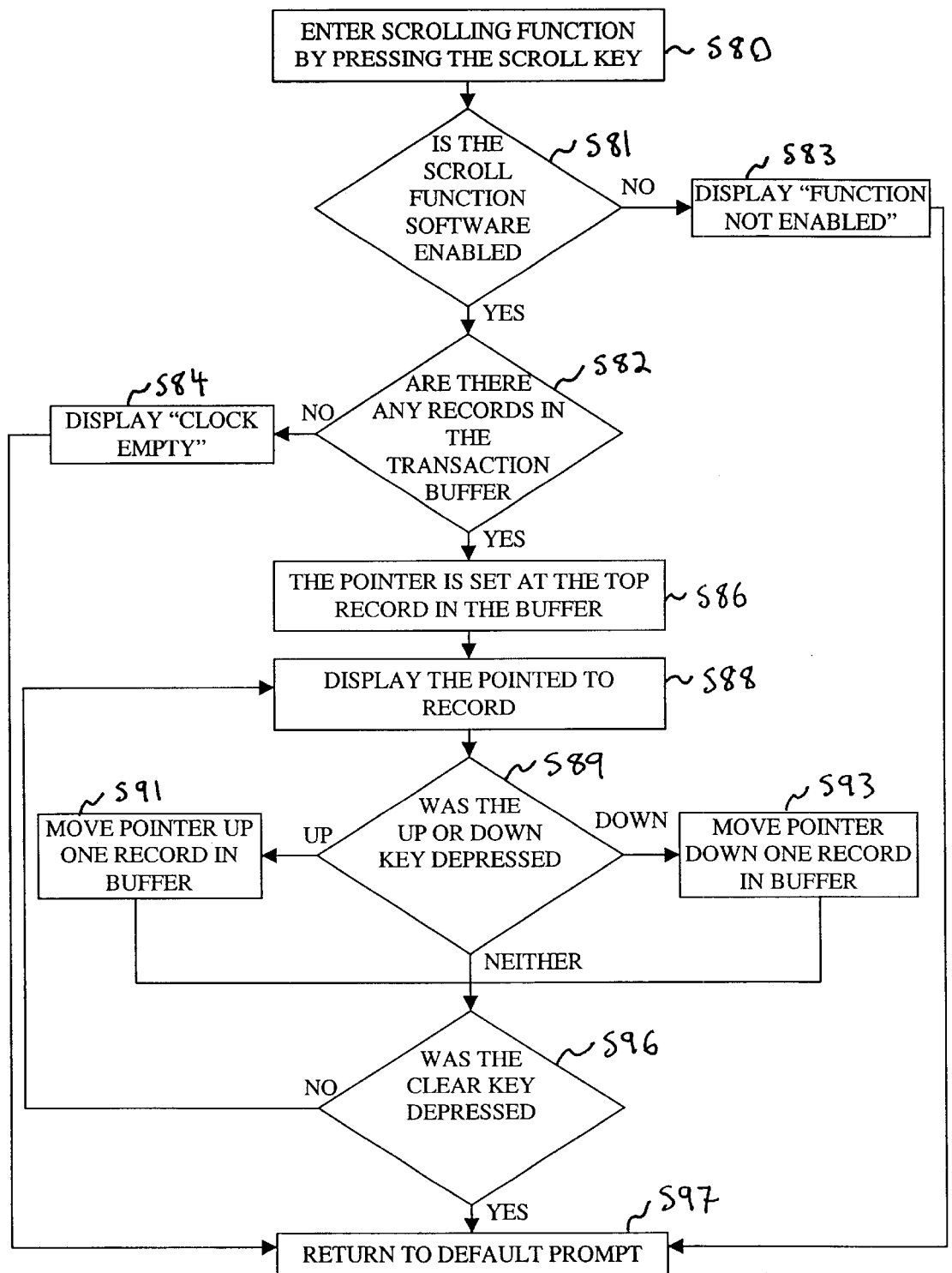
FIG. 8 is a flow chart of the scrolling function.

Record retrieval will be described in conjunction with FIG. 8. To initiate record retrieval, the scroll key 100 is depressed (S80). If record retrieval/scroll function is not activated (S81), "FUNCTION NOT ENABLED" is displayed in display screen 68 (S83). If there are no records stored in the buffer 92 (S82), "CLOCK EMPTY" is displayed in display screen 68 (S84), and record retrieval is terminated. The display screen 68 returns to the default screen of normal operations (S97). If the buffer 92 contains records (S82), a pointer will be set at the top record $94_1$ (S86). This record $94_1$ will be displayed on the display screen 68 (S88). To move the pointer down one position in the buffer 92 (S93), the down key 98 is depressed on the keypad 40 (S89). Conversely, to move the arrow up one position in the buffer 92 (S91), the up key 96 is depressed (S89). Ultimately, the selected record is displayed in the display screen 68 (S88). By way of illustration, the pointer is initially set at the top record $94_1$. The down key 98 is depressed and one record down $94_2$ in the buffer 92 is displayed. As a result, an operator can scroll through all of the records $94_1$–$94_N$ by operating the up and down keys 96 and 98.

If the pointer is at the top record $94_1$ and the up 96 arrow key or at the bottom record $94_N$ and the down 98 arrow key is depressed, the pointer remains at its previous position and the same record is displayed. To illustrate, the pointer is set at the bottom record $94_N$. The down arrow 98 is depressed. The pointer remains at the bottom record $94_N$ and the bottom record $94_N$ is displayed. To exit the record retrieval mode, the clear key 102 is depressed (S96) and the display screen 68 returns to the default prompt (S97).

Preferably, if either the up 96, down 98, scroll 100 or clear keys 102 are depressed, the speaker 70 emits a sound and the green LED 66 illuminates. Additionally, if record retrieval mode is exited and normal operations resume, the speaker 70 also emits a sound and the green LED 66 illuminates.

The record retrieval mode provides for quick access to all of the stored records. By simply depressing the scroll key 100 followed by the up 96 and down 98 keys, any record $94_1$–$94_N$ in the transaction buffer is readily retrieved. This quick access is desirable in many situations. For instance, an underage individual may use a high quality forged document to engage in an age controlled activity. When subsequently stopped by a law enforcement officer, that underage individual may present a second identification document indicating the individual's true age. In such a situation, quickly displaying the identification number of the presented identification document may resolve the situation and avoid a citation or the filing of charges against the establishment that engaged in an unauthorized transaction.

The record retrieval mode of this age verification device facilitates its use as a stand alone unit. The verification data from the most current back through a number of past verifications is retrievable without the need for a printer 80 or downloading to another media.

What is claimed is:

1. An age eligibility verification apparatus, the apparatus comprising:

means for reading encoded data from an identification document, presented by an individual for partaking in an age restricted activity;

means for storing a plurality of records, each record associated with a verification attempt and previously read encoded data;

means for displaying a stored record; and means for sequentially displaying the stored records in response to an operator input in a sequence based on when each record's verification attempt occurred.

2. The apparatus of claim 1 wherein the sequentially displaying means includes a pointer indicating which of the records in the storing means is displayed.

3. The apparatus of claim 2 wherein the storing means stores the records in positions based on when each record's verification attempt occurred.

4. The apparatus of claim 3 wherein the records are stored sequentially from the record's first verified to the last verified.

5. The apparatus of claim 4 wherein the pointer moves to the next verification record or the previous verification record in response to an operator input.

6. The apparatus of claim 5 further comprising a key pad having an up and a down key and in response to the up key being depressed the pointer moves to the next verification record and in response to the down key being depressed the pointer moves to the previous verification record.

7. The apparatus of claim 1 wherein each of the records contains a determined age of the individual.

8. The apparatus of claim 1 wherein the apparatus determines an individual's eligibility to partake in a plurality of age restricted activities and each of the records includes an indication of which of the age restricted activities the presenting individual is eligible to partake.

9. The apparatus of claim 1 further comprising means for inputting a result of an operator's verification that an appearance of a presenting individual matches a photograph of the presented identification document; wherein each of the records includes the appearance verification result.

10. The apparatus of claim 1 wherein each of the records includes an identifier of an operator conducting the verification.

11. The apparatus of claim 1 further comprising means for prompting an operator to input age data when age data is not encoded on the presented document; wherein the records for the presented documents not including encoded age data include the inputted age data.

12. A method for age eligibility verification, the method comprising:

reading encoded data from an identification document presented by an individual for partaking in an age restricted activity;

storing a plurality of records in a transaction buffer, wherein a new record is stored in said transaction buffer as a top record and a previously stored record is shifted down one position for each new record stored, each record being associated with a verification attempt and previously read encoded data;

displaying a stored record; and sequentially displaying the stored records in response to an operator input in a sequence based on when each record's verification attempt occurred.

13. An apparatus for verifying eligibility to partake in an age restricted activity and retrieving data associated with each verification, the apparatus comprising:

means for reading encoded data from a presented document;

means for determining a lack of encoded age data and outputting a signal;

means for inputting age data in response to the signal;

means for considering the age data as part of verifying the individual's eligibility;

means for creating a record of associated verification data;

means for storing a plurality of records; and means for selectively displaying the stored records.

14. The apparatus of claim 13 further comprising means for displaying an operator prompt in response to the outputted signal.

15. The apparatus of claim 14 further comprising means for inputting an operator code; wherein each of the records includes the operator code of the operator conducting tile verification.

16. The apparatus of claim 15 further comprising means for inputting a result of an operator's verification that an appearance of the present individual matches a photograph of the presented document; wherein each record includes an appearance verification result.

17. The apparatus of claim 14 wherein the selectively displaying means includes a pointer indicating which one of the records is displayed and in response to an operator's keypad input selectively moving the pointer to a different one of the records.

18. The apparatus of claim 14 operating as a stand alone unit, wherein in response to the storing means being full, for each additional record added to the storing means the record that was first verified out of the stored records is discarded.

19. The apparatus of claim 14 operating as a stand alone unit, wherein in response to the storing means being full, the storing means will not accept additional records.

20. The apparatus of claim 19 further comprising means for downloading the stored records into another storage media.

* * * * *